United States Patent
Thiesse (10) Patent No.: US 10,550,528 B2
(45) Date of Patent: *Feb. 4, 2020

(54) SYSTEM FOR HEATING A PAVING SCREED

(71) Applicant: Caterpillar Paving Products Inc., Brooklyn Park, MN (US)

(72) Inventor: Chad M. Thiesse, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/296,750

(22) Filed: Mar. 8, 2019

(65) Prior Publication Data

US 2019/0203427 A1  Jul. 4, 2019

Related U.S. Application Data

(63) Continuation of application No. 15/805,739, filed on Nov. 7, 2017, now Pat. No. 10,280,572.

(51) Int. Cl.
| | | |
|---|---|---|
| *E01C 19/48* | (2006.01) | |
| *G05D 23/19* | (2006.01) | |
| *H05B 1/02* | (2006.01) | |

(52) U.S. Cl.
CPC .......... *E01C 19/48* (2013.01); *G05D 23/193* (2013.01); *H05B 1/023* (2013.01); *H05B 1/0294* (2013.01); *E01C 2301/10* (2013.01)

(58) Field of Classification Search
CPC ... E01C 19/48; E01C 2301/10; G05D 23/193; H05B 1/023; H05B 1/0294

USPC .............................. 404/75–85, 101–110, 118
See application file for complete search history.

(56) References Cited

U.S. PATENT DOCUMENTS

| | | |
|---|---|---|
| 3,082,460 A | 3/1963 | Haivala |
| 3,702,578 A | 11/1972 | Davin |
| 4,650,366 A | 3/1987 | Morrison |
| 5,356,238 A | 10/1994 | Mushl et al. |
| 5,366,320 A | 11/1994 | Hanlon et al. |
| 5,540,519 A | 7/1996 | Weber |
| 5,895,172 A | 4/1999 | Grembowicz et al. |
| 5,921,708 A | 7/1999 | Grundl et al. |

(Continued)

FOREIGN PATENT DOCUMENTS

| | | |
|---|---|---|
| DE | 19537691 | 4/1996 |
| EP | 0667415 | 3/1999 |

(Continued)

*Primary Examiner* — Raymond W Addie
(74) *Attorney, Agent, or Firm* — Bookoff McAndrews; Oblon, McClelland, Maier & Neustadt (57) ABSTRACT

A system for controlling heating of a screed plate includes screed plate disposed along the paving material delivery path. A first temperature sensor is operative to monitor a screed plate temperature and a second temperature sensor along the paving material delivery path is operative to monitor an actual paving material temperature of a paving material being applied to a work surface. A controller is configured to determine an estimated paving material temperature adjacent the screed plate based upon the actual paving material temperature and operate a heater to maintain the screed plate temperature within a temperature variation range relative to the estimated paving material temperature.

20 Claims, 7 Drawing Sheets

(56) References Cited

U.S. PATENT DOCUMENTS

| | | |
|---|---|---|
| 6,203,243 B1 | 3/2001 | Birtchet |
| 6,334,735 B1 | 1/2002 | Williams et al. |
| 6,550,214 B2 | 4/2003 | Aguilera |
| 6,769,836 B2 | 8/2004 | Lloyd |
| 6,805,516 B2 | 10/2004 | Barnat et al. |
| 6,981,820 B2 | 1/2006 | Nelson |
| 7,217,062 B2 | 5/2007 | Pisano et al. |
| 7,470,082 B2 | 12/2008 | Lloyd |
| 7,651,296 B2 | 1/2010 | Lindley |
| 8,099,218 B2 | 1/2012 | Glee et al. |
| 8,152,409 B1 | 4/2012 | Ligman |
| 8,297,875 B1 | 10/2012 | Kopacz et al. |
| 8,454,266 B2 | 6/2013 | Buschmann et al. |
| 8,517,628 B2 | 8/2013 | Weiser et al. |
| 8,591,146 B2 | 11/2013 | Begley et al. |
| 8,636,442 B1 | 1/2014 | Sopko, Jr. et al. |
| 8,744,646 B2 | 6/2014 | Buschmann et al. |
| 8,930,092 B2 | 1/2015 | Minich |
| 8,998,530 B2 | 4/2015 | Buschmann et al. |
| 9,011,038 B2 | 4/2015 | Buschmann et al. |
| 9,045,870 B2 | 6/2015 | Buschmann et al. |
| 9,068,295 B2 | 6/2015 | Rutz et al. |
| 9,481,964 B1 | 11/2016 | Marsolek |
| 9,611,595 B2 | 4/2017 | Marsolek et al. |
| 9,657,447 B2 | 5/2017 | Mattson |
| 9,811,952 B2 | 11/2017 | Carlson |
| 9,845,578 B2 | 12/2017 | Marsolek et al. |
| 2002/0182009 A1 | 12/2002 | Barnat et al. |
| 2004/0260504 A1 | 12/2004 | Bienvenu et al. |
| 2006/0080442 A1 | 4/2006 | Ferguson et al. |
| 2007/0050137 A1 | 3/2007 | Woon et al. |
| 2008/0249729 A1 | 10/2008 | Martinez et al. |
| 2009/0142133 A1 | 6/2009 | Glee et al. |
| 2009/0257825 A1 | 10/2009 | Nelson |
| 2010/0178107 A1 | 7/2010 | Braddy et al. |
| 2010/0283598 A1 | 11/2010 | King et al. |
| 2012/0087726 A1 | 4/2012 | Smieja |
| 2012/0288328 A1 | 11/2012 | Minich |
| 2013/0124010 A1 | 5/2013 | Olson et al. |
| 2013/0136539 A1 | 5/2013 | Aardema |
| 2013/0290062 A1 | 10/2013 | Patel |
| 2014/0363231 A1 | 12/2014 | Bartoszek |
| 2015/0003914 A1 | 1/2015 | Steinhagen et al. |
| 2015/0247294 A1* | 9/2015 | Weiler .................. E01C 19/48 404/84.05 |
| 2016/0042235 A1* | 2/2016 | Buschmann .......... G06T 7/0004 348/148 |
| 2016/0060819 A1* | 3/2016 | Oetken ................ E01C 19/002 404/72 |
| 2016/0245785 A1 | 8/2016 | Marsolek et al. |
| 2017/0205814 A1 | 7/2017 | Marsolek |
| 2017/0205999 A1 | 7/2017 | Marsolek |

FOREIGN PATENT DOCUMENTS

| | | |
|---|---|---|
| EP | 1566484 | 8/2005 |
| JP | 2011-132761 | 7/2011 |

* cited by examiner

SYSTEM FOR HEATING A PAVING SCREED

CROSS-REFERENCE TO RELATED APPLICATIONS

This application is a continuation application of U.S. patent application Ser. No. 15/805,739, filed Nov. 7, 2017, the entirety of which is herein incorporated by reference.

TECHNICAL FIELD

This disclosure relates generally to paving machines and, more particularly, to a system and method for controlling a screed plate heating system.

BACKGROUND

Paving machines are generally used for laying a heated paving material, such as bituminous aggregate mixtures or asphalt, onto a roadbed and spreading the heated paving material to achieve a road with a uniform, smooth surface. After the heated asphalt is laid, it is compacted and cools so that the road becomes passable by vehicles.

The paving machines include a screed assembly for spreading the heated material. The screed assembly typically has one or more screed plates and these screed plates are heated to prevent the paving material from adhering or sticking to the screed plate. However, if the temperature of the screed plates is too high, energy is wasted, and the screed plate is subjected to excessive wear and tear. Generally, the screed plates should be heated to a temperature close to the temperature of the heated asphalt material.

U.S. Pat. No. 6,981,820 discloses a system and method for automated heating of screed plates of a paving system. The system includes an electric heater that applies heat to the screed plate, either continuously or intermittently, depending on ambient conditions, the temperature of the paving material and the speed at which the paving machine is operating. For intermittent operation, the supply of power to the heater can be either manual or automatic through a control system and sensors that monitor the temperature of the screed plate.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for controlling heating of a screed plate includes a paving material delivery path, a screed plate, a first temperature sensor, a second temperature a heater, and a controller. The screed plate is operably mounted on a mobile machine and disposed along the paving material delivery path. The first temperature sensor is associated with the screed plate and is configured to generate first temperature signals indicative of a screed plate temperature. The second temperature sensor is disposed along the paving material delivery path and is configured to generate second temperature signals indicative of an actual paving material temperature of a paving material being applied to a work surface. The heater is operatively associated with the screed plate and configured to heat the screed plate. The controller is configured to access a temperature variation range, receive the first temperature signals, and determine the screed plate temperature based upon the first temperature signals. The controller is further configured to receive the second temperature signals, determine the actual paving material temperature based upon the second temperature signals, and determine an estimated paving material temperature adjacent the screed plate based upon the actual paving material temperature. The controller is still further configured to generate command signals to operate the heater to maintain the screed plate temperature within the temperature variation range relative to the estimated paving material temperature.

In another aspect, a method of controlling heating of a screed plate includes providing a screed plate operably mounted on a mobile machine and disposed along a material delivery path, accessing a temperature variation range, receiving first temperature signals from a first temperature sensor associated with the screed plate with the first temperature signals being indicative of a screed plate temperature, and determining the screed plate temperature based upon the first temperature signals. The method further includes receiving second temperature signals from a second temperature sensor disposed along a paving material delivery path with the second temperature signals being indicative of an actual paving material temperature of a paving material being applied to a work surface, determining the actual paving material temperature based upon the second temperature signals, determining an estimated paving material temperature adjacent the screed plate based upon the actual paving material temperature, and generating command signals to operate a heater associated with the screed plate and configured to heat the screed plate to maintain the screed plate temperature within the temperature variation range relative to the estimated paving material temperature.

In still another aspect, a paving machine includes a ground engaging drive mechanism to propel the paving machine, a paving material delivery path, and a screed assembly, including a screed plate, disposed along the paving material delivery path and configured for applying paving material to a work surface. A first temperature sensor is associated with the screed plate and is configured to generate first temperature signals indicative of a screed plate temperature. The second temperature sensor is disposed along the paving material delivery path and is configured to generate second temperature signals indicative of an actual paving material temperature of a paving material being applied to a work surface. A heater is operatively associated with the screed plate and configured to heat the screed plate. A controller is configured to access a temperature variation range, receive the first temperature signals, and determine the screed plate temperature based upon the first temperature signals. The controller is further configured to receive the second temperature signals, determine the actual paving material temperature based upon the second temperature signals, and determine an estimated paving material temperature adjacent the screed plate based upon the actual paving material temperature. The controller is still further configured to generate command signals to operate the heater to maintain the screed plate temperature within the temperature variation range relative to the estimated paving material temperature.

DETAILED DESCRIPTION

Figure 1:
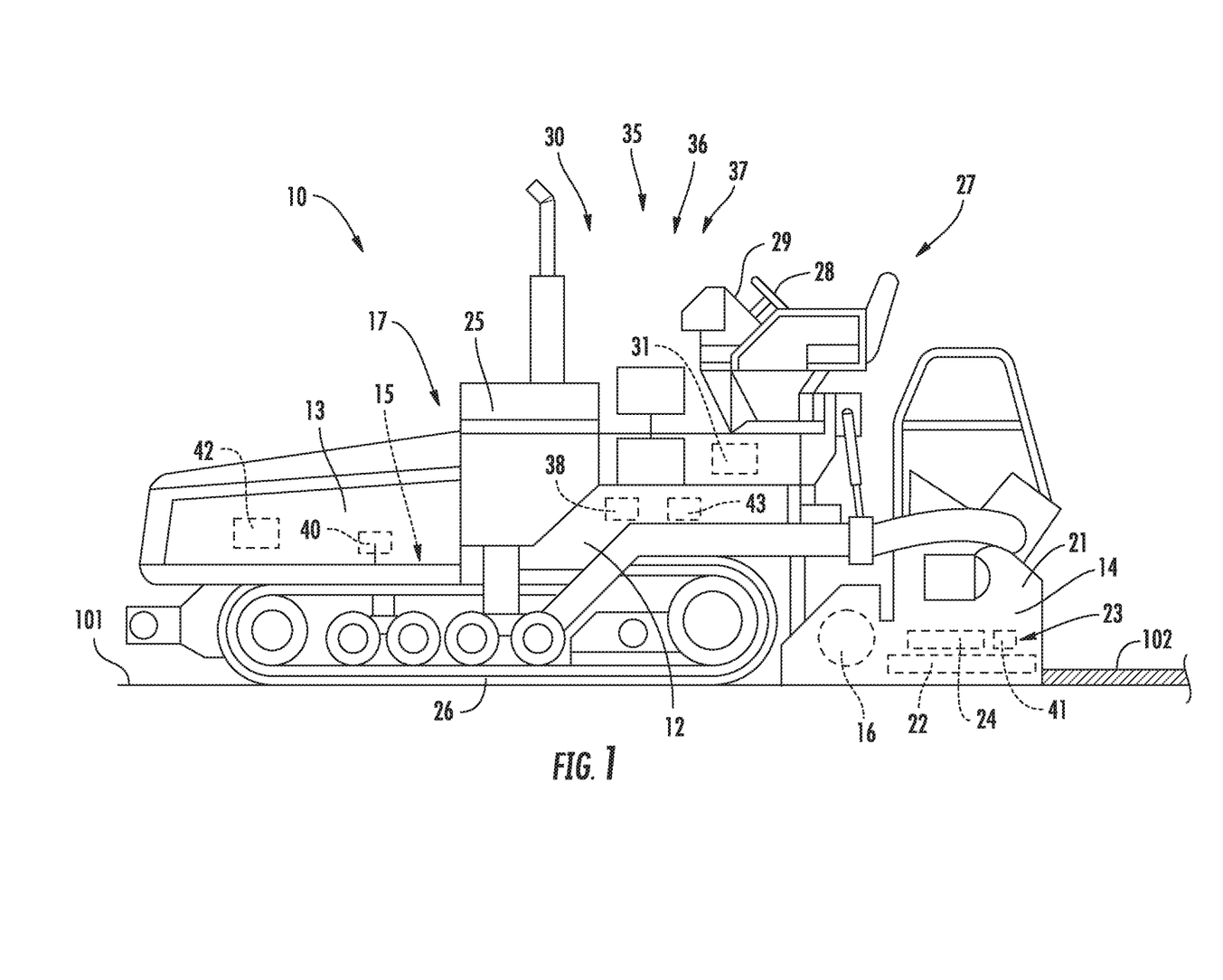
FIG. 1 depicts a schematic illustration of a paving machine performing a paving operation according to the disclosure.

Referring to FIG. 1, a paving machine 10 is depicted. Paving machine 10 may include a body 12, a material receiving unit such as a hopper 13 for storing paving material, such as asphalt, and a material application system including a screed assembly 14 for applying paving material 102 in a conventional manner to a work surface such as a roadbed 101. A transport mechanism such as a conveyor system 15 transfers paving material from the hopper 13 to an auger 16, which distributes the paving material laterally to the screed assembly 14. The hopper 13, conveyor system 15, auger 16, and screed assembly 14 may sequentially define a paving material delivery path 17 within or of the paving machine 10.

The screed assembly 14 may include a body 21 with one or more screed plates 22 disposed along the paving material delivery path 17 and a heating system 23 operatively associated with the screed plate and configured to heat the screed plate. The heating system 23 may operate to maintain the screed plate 22 at a desired operational temperature. In one example, the operational temperature may be set at a temperature between 110 and 160 degrees C. The heating system 23 includes at least one heater 24 that may be powered in any desired manner such as by electricity or gas.

In operation, the heater 24 may be cycled on and off to maintain the screed plate 22 within a desired temperature variation range adjacent or about the desired operational temperature rather than continuously heating the screed plate. In an example in which the desired screed plate temperature is 130 degrees C. and the temperature variation range is ±10 degrees C., the heating system 23 may turn on the heater 24 when the screed plate temperature is falls below 120 degrees C. and turn off the heater when the screed plate temperature is greater than 140 degrees C.

A prime mover such as engine 25 may be operatively connected to a ground engaging drive mechanism such as tracks 26 to propel the machine. An operator station 27 may include a plurality of input devices 28 for controlling the paving machine 10 and one or more display devices 29 for displaying information relevant to the operation of the machine and a paving operation.

A paver control system indicated generally at 30 to indicate association with paving machine 10 may operate to control certain aspects of the paving machine and also communicate information between the paving machine and other machines and systems remote from the paving machine. The paver control system 30 may include an electronic control module or paver controller 31. The paver controller 31 may receive input signals from systems associated with the paving machine 10. The paver controller 31 may also receive input signals from systems outside of the paving machine 10 such as GPS signals and signals indicative of the weather that may affect the operation of the paving machine 10 or the paving process. The paver controller 31 may control the operation of various aspects of the paving machine 10 as well as generate desired communications, as described in more detail below.

The paver controller 31 may be an electronic controller that operates in a logical fashion to perform operations, execute control algorithms, store and retrieve data and other desired operations. The paver controller 31 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the paver controller 31 such as power supply circuitry, signal conditioning circuitry, driver circuitry, and other types of circuitry.

The paver controller 31 may be a single controller or may include more than one controller disposed to control various functions and/or features of the paving machine 10. The term "controller" is meant to be used in its broadest sense to include one or more controllers and/or microprocessors that may be associated with the paving machine 10 and that may cooperate in controlling various functions and operations of the machine 10. The functionality of the paver controller 31 may be implemented in hardware and/or software without regard to the functionality. The paver controller 31 may rely on one or more data maps relating to the operating conditions and the operating environment of the paving machine 10 that may be stored in the memory of controller. Each of these data maps may include a collection of data in the form of tables, graphs, and/or equations to maximize the performance and efficiency of the paving machine 10 and its operation.

The paver control system 30 and the paver controller 31 may be located on the paving machine 10 or may be distributed so that certain functions are performed on the paving machine 10 and other functions are performed remotely.

Paving machine 10 may be equipped with a plurality of paver sensors 35, as shown generally by an arrow in FIG. 1 indicating association with the paving machine, that provide data indicative (directly or indirectly) of various operating parameters of the paving machine, systems associated with the paving machine, and/or the operating environment in which the paving machine is operating. The term "sensor" is meant to be used in its broadest sense to include one or more sensors and related components that may cooperate to sense various functions, operations, and operating characteristics of a machine or system and/or aspects of the environment in which the machine or system is operating. In operation, a sensor may generate signals indicative of a characteristic or data being measured.

A position sensing system 36, as shown generally by an arrow in FIG. 1 indicating association with the paving machine 10, may include a position sensor 37, also shown generally by an arrow in FIG. 1, to sense the position of the paving machine. The position sensor 37 may include a plurality of individual sensors that cooperate to generate and provide position signals to paver controller 31 indicative of the position and orientation of the machine 10. The position sensor 37 may include one or more sensors that interact with a positioning system such as a global navigation satellite system or a global positioning system to operate as a position sensor. The paver controller 31 may use position signals from the position sensor 37 to determine the position of the paving machine 10 relative to an earth reference (e.g., GPS).

A ground speed sensor 38 for determining the ground speed of the paving machine 10 may be provided as a dedicated or standalone sensor or as part of position sensor 37. Alternatively, if desired, the position sensing system 36 may also be used to determine the ground speed of the paving machine 10.

Additional sensors may be provided such as a mix delivery or feed rate sensor 40 that may be used to determine the rate at which material from the hopper 13 is being fed by the conveyor system 15 to the screed assembly 14. A first or screed plate temperature sensor 41 may be associated with, such as disposed adjacent, the screed plate 22 to determine or monitor the temperature of the screed plate. A second or delivery path temperature sensor 42 may be provided at any location along the paving material delivery path 17 of the paving machine 10. In one example, the delivery path temperature sensor 42 may be provided or disposed at a location remote from the screed plate 22 such as within or along the hopper 13. In another example, the delivery path temperature sensor 42 may be disposed along the conveyor system 15. In a further example, the delivery path temperature sensor 42 may be disposed adjacent the screed assembly 14 such as adjacent the auger 16.

The delivery path temperature sensor 42 may be used to determine or monitor the temperature of the paving material along the paving material delivery path 17 adjacent the sensor to assist in controlling the temperature of the screed plate 22 as discussed in further detail below. Thus, it may be understood that the screed plate temperature sensor 41 generates first or screed plate temperature signals indicative of the temperature of the screed plate 22 and the delivery path temperature sensor 42 generates second or delivery path temperature signals indicative of the temperature at the location of the delivery path temperature sensor.

If desired, an ambient weather sensor 43 may be provided on paving machine 10. In an alternate embodiment, weather conditions at the paving machine 10 may be accessed by the paver controller 31 from various known sources.

During a paving operation, it may be desirable to maintain the temperature of the screed plate 22 at or above the temperature of the paving material to prevent or reduce the likelihood of that paving material will adhere or stick to the screed plate. Accordingly, it may be desirable to determine or estimate the temperature of the paving material adjacent the screed plate 22 and control the heating system 23 to maintain the screed plate at a desired temperature or within a desired temperature variation range. In one example, the desired temperature variation range may be set at the temperature of the paving material at the screed plate 22±5 degrees C. In another example, the temperature variation range may be set at the temperature of the paving material at the screed plate 22±10 degrees C. In still other examples, the temperature variation range of the screed plate 22 may be set so that the lower limit is at the estimated temperature of the paving material at the screed plate. Other temperature ranges are contemplated.

To determine or estimate the temperature of the paving material adjacent the screed plate 22, the temperature of the paving material adjacent the delivery path temperature sensor 42 may be determined and adjustments made, if desired, to the measured or sensed temperature based upon various factors or temperature adjustment characteristics. One temperature adjustment characteristic may be the distance between the delivery path temperature sensor and the screed plate 22. For example, if the delivery path temperature sensor 42 is adjacent the auger 16, a small or no adjustment in the sensed temperature may be necessary to estimate the temperature of the paving material adjacent the screed plate 22. If the delivery path temperature sensor 42 is further remote from the screed plate 22, such as at hopper 13, a greater adjustment to the sensed temperature may be necessary to estimate the temperature of the paving material adjacent the screed plate 22.

In some instances, greater accuracy of the estimate of the temperature of the paving material adjacent the screed plate 22 may be achieved by utilizing additional or other temperature adjustment characteristics such as the weather conditions at the paving machine 10 (e.g., the ambient temperature of the air) and/or the rate at which the paving material is being fed from the hopper 13 to the screed assembly 15.

Figure 2:
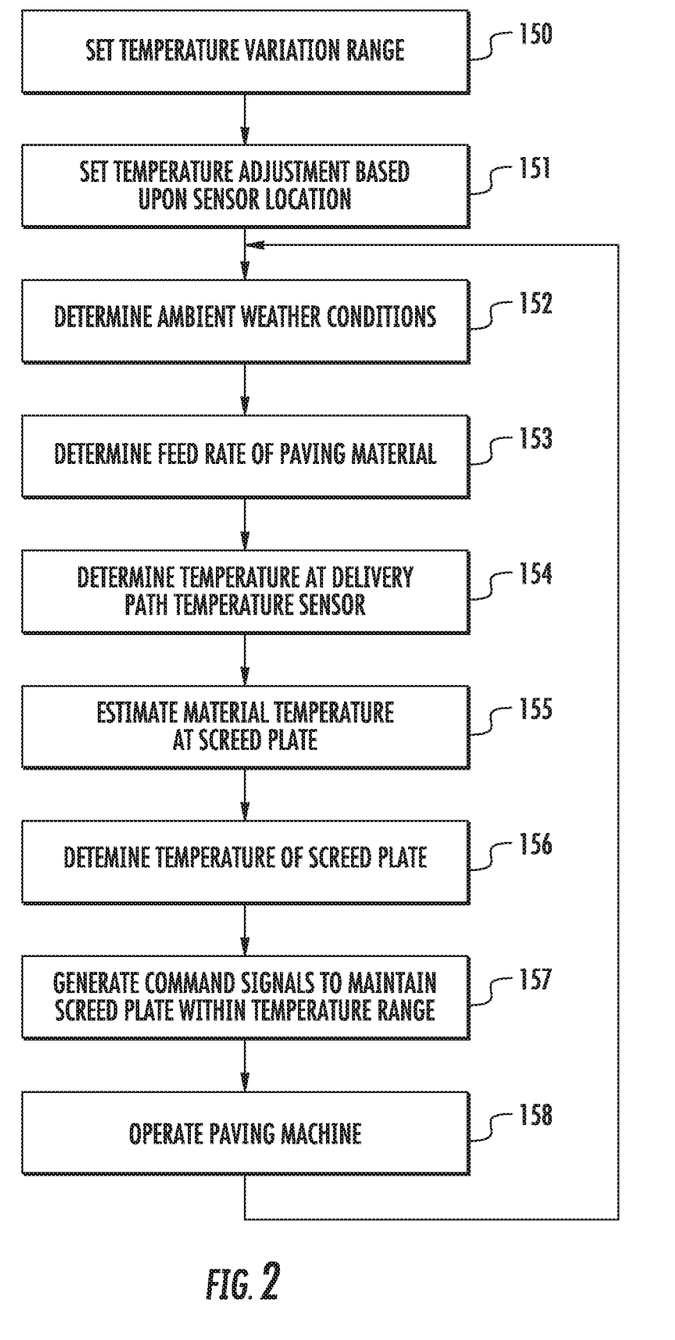
FIG. 2 depicts a flowchart illustrating a screed heating process in conjunction with the paving operation of FIG. 1.

Referring to FIG. 2, a flowchart of an exemplary paving operation utilizing paving machine 10 is depicted. At stage 150, a desired temperature variation range that the screed plate temperature can vary during a paving operation may be set or stored within paver controller 31. In an alternate embodiment, the temperature variation range may be stored remotely from the paver controller 31 and the paver controller may access the desired temperature range. The temperature variation range may reflect a range of acceptable or desirable screed temperatures for a given paving operation. In other words, the temperature variation range represents a range of temperatures of the screed plate 22 within or between which the heating system 23 will maintain the temperature of the screed plate based upon an estimate of the temperature of the paving material at the screed plate.

A temperature adjustment based upon the distance between the screed plate 22 and the delivery path temperature sensor 42 may be set or stored within the paver controller 31 at stage 151. In an alternate embodiment, such a distance temperature adjustment may be stored remotely from the paver controller 31 and the paver controller may access the distance temperature adjustment. The distance temperature adjustment may be used by the paver controller 31 to assist in estimating the paving material temperature adjacent the screed plate 22 based upon the temperature at the delivery path temperature sensor 42. Since the distance between the screed plate 22 and the delivery path temperature sensor 42 may be fixed for most paving equipment setups, such an adjustment characteristic may be referred to as a fixed temperature adjustment characteristic for a given paving machine setup.

At stage 152, a dynamic temperature adjustment characteristic such as the weather conditions (e.g., ambient temperature and/or wind conditions) at the paving machine 10 may be determined. The weather conditions may be determined by an on-board sensor such as ambient weather sensor 43 or may be accessed by the paver controller 31 from known weather sources. Still another dynamic temperature adjustment characteristic in the form of the feed rate of paving material from the hopper 13 to the screed assembly 14 may be determined at stage 153 based upon feed rate signals or data from the feed rate sensor 40.

At stage 154, the paver controller 31 may determine the actual paving material temperature at the delivery path temperature sensor 42 based upon signals from the sensor. The paver controller 31 may determine at stage 155 an estimated paving material temperature adjacent the screed plate 22. In doing so, the paver controller 31 may utilize the sensed or actual paving material temperature at the delivery path temperature sensor 42 and adjust the sensed temperature based upon one or more temperature adjustment characteristics. In one example, the paver controller 31 may utilize lookup charts or equations to determine an estimate of the temperature drop from the delivery path temperature sensor 42 to the screed plate 22 based upon the distance from the delivery path temperature sensor to the screed plate in view of the weather conditions and the feed rate of the paving material.

For example, one would expect a greater temperature drop if the delivery path temperature sensor 42 is relatively far from the screed plate 22, the paving operation is occurring on a relatively cool and windy day, and the paving material is being fed relatively slowly. The estimated temperature drop would be expected to be less as the distance between the delivery path temperature sensor 42 and the screed plate 22 is reduced, as the ambient temperature at the paving machine 10 increases, and as the feed rate of paving material increases. In an extreme example, if the delivery path temperature sensor 42 were positioned adjacent the auger 16, little or no temperature adjustment of the sensed temperature may be necessary to estimate the temperature of the paving material at the screed plate 22.

At stage 156, the paver controller 31 may determine the screed plate temperature at the screed plate temperature sensor 41 based upon screed plate temperature signals from the sensor. The paver controller 31 may generate at stage 157 command signals to maintain the temperature of the screed plate 22 within the desired temperature range of the estimate of the paving material temperature at the screed plate. In doing so, the paver controller 31 may compare the actual temperature of the screed plate 22 to the estimated temperature of the paving material at the screed plate and turn on or cycle the heating system 23 as necessary so that the temperature of the screed plate remains within the desired temperature variation range of the estimated temperature of the paving material at or adjacent the screed plate.

In addition to controlling the heating system 23 by cycling the heater 24 on and off to heat the screed plate 22, the paver controller 31 may be configured to turn off the heater for an extended period of time if the screed is substantially hotter (i.e., above the desired temperature range) than the estimated temperature of the paving material at the screed plate. Further, the paver controller 31 may be configured to operate the heater for an extended period of time if the screed is substantially cooler (i.e., below the desired temperature range) than the estimated temperature of the paving material at the screed plate. Relatively large differences between the estimate of the paving material temperature at the screed plate 22 as compared to the actual temperature of the screed may occur upon a change in the source of the paving material (e.g., upon a new load of paving material being dumped into hopper 13).

At stage 158, the paving machine 10 may continue to be operated and paving material 102 applied to the work surface and stages 152-157 repeated.

In some instances, the delivery path temperature sensor may not be located on the paving machine 10. In such case, a sensed or actual paving material temperature remote from the paving machine 10 may be determined and the remote actual paving material temperature used to estimate the temperature of the paving material adjacent the screed plate 22.

Figure 3:
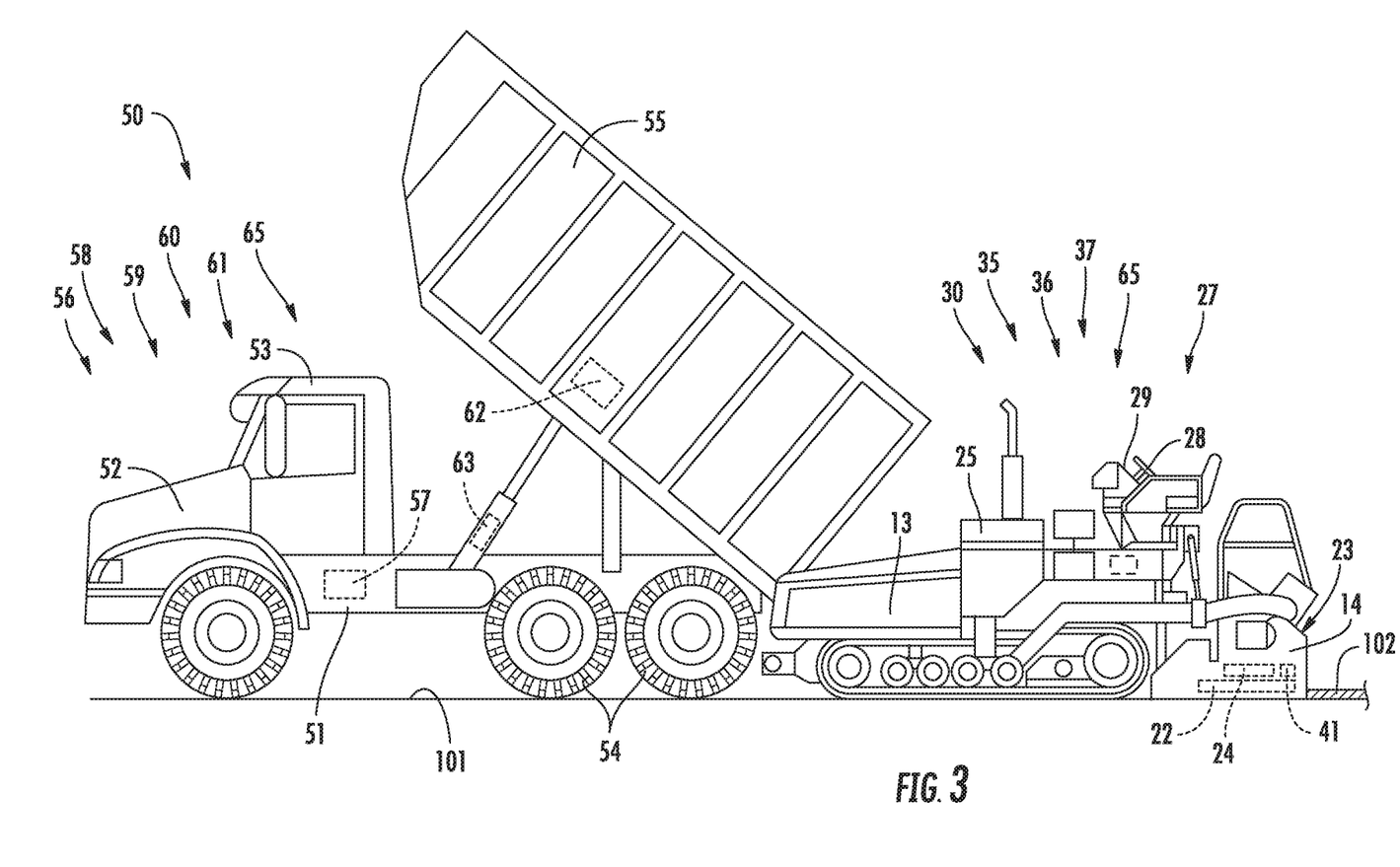
FIG. 3 depicts a schematic illustration of a work site at which a paving machine and a haul truck are performing a paving operation.

In one example, a paving machine 10 may be operated in conjunction with material supply machine such as a haul truck 50 that transports and supplies paving material to the paving machine. Referring to FIG. 3, haul truck 50 may include a chassis 51 that supports a prime mover such as an engine 52 and a cab 53 for an operator. The engine 52 is operatively connected to and drives a ground engaging drive mechanism such as wheels 54. A material transport unit such as a dump body 55 is pivotally mounted on the chassis 51 and receives a payload to be hauled from one location to another.

Haul truck 50 may include a truck control system 56 and a truck controller 57, each being generally indicated by an arrow in FIG. 3 indicating association with the haul truck 50, that are generally similar or identical to the paver control system 30 and the paver controller 31 of the paving machine 10, respectively. The truck control system 56 and the truck controller 57 may be located on the haul truck 50 or may be distributed so that certain functions are performed on the haul truck 50 and other functions are performed remotely.

Haul truck 50 may be equipped with a plurality of truck sensors 58, as shown generally by an arrow in FIG. 3 indicating association with the haul truck, that provide data indicative (directly or indirectly) of various operating parameters of the truck, systems associated with the truck, and/or the operating environment in which the truck is operating.

A position sensing system 59, as shown generally by an arrow in FIG. 3 indicating association with the haul truck 50, may include a position sensor 60, also shown generally by an arrow in FIG. 3, to sense the position of the truck. The position sensing system 59 and position sensor 60 may be generally similar to the position sensing system 36 and position sensor 37 of paving machine 10, respectively. Further, the haul truck 50 may include a ground speed sensor 61 for determining the ground speed of the haul truck, with the ground speed sensor being generally similar to that of the paving machine 10.

Haul truck 50 may also include truck temperature sensor 62 and a pivot position sensor 63. The truck temperature sensor 62 may be positioned at any desired location relative to the dump body 55 so as to monitor the temperature of the load (e.g., paving material) within the dump body 55. Accordingly, the truck temperature sensor 62 functions as a delivery path temperature sensor that is remote from the paving machine 10. The pivot position sensor 63 may be used to monitor the position of the dump body relative to the chassis 51 to control the flow of material from the dump body.

Each of the paving machine 10 and haul truck 50 may include a wireless communications system 65 to permit wireless transmission of a plurality of instructions and information between the paving machine 10 and the haul truck 50 as well as permit communication with other machines and systems remote from the paving machine and haul truck. In one embodiment depicted in FIG. 4, each wireless communications system 65 may include a transmitter 66 for transmitting signals and a receiver 67 for receiving signals from a transmitter system of another wireless communications system. In some instances, the transmitter 66 and the receiver 67 may be combined as a transceiver system. In some embodiments, the paving machine 10 may only include a receiver system and the haul truck 50 may only include a transmitter system.

Figure 4:
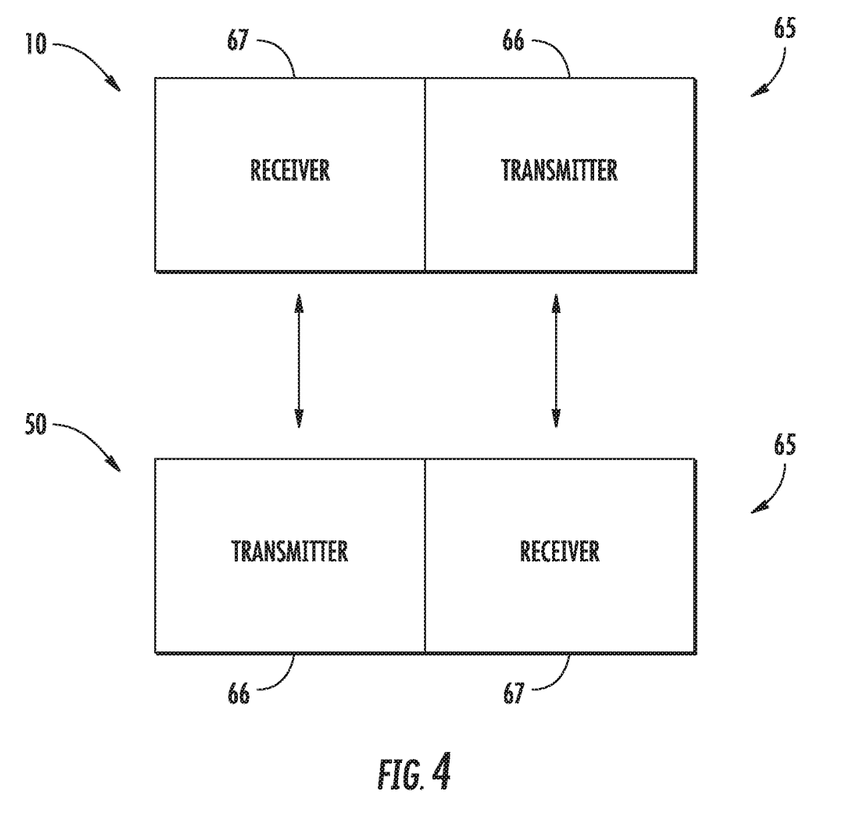
FIG. 4 depicts a schematic illustration of a wireless communications system.

Wireless communications systems 65 may implement or utilize any desired system or protocol including any of a plurality of communications standards. The desired protocols will permit communication between the paving machine 10 and haul truck 50 as well as any other desired machines or systems. Examples of wireless communications systems or protocols that may be used by the wireless communications systems 65 include a wireless personal area network such as Bluetooth® (e.g., IEEE 802.15), a local area network such as IEEE 802.11b or 802.11g, a cellular network, or any other system or protocol for data transfer. Other wireless communications systems and configurations are contemplated.

As depicted in FIG. 3, during a paving operation, the paving machine 10 may be supplied with paving material from an aligned haul truck 50 and a layer of paving material 102 applied to the work surface. In some instances, the paving machine 10 may push the haul truck 50 while the paving machine is simultaneously applying a layer of paving material and the haul truck is loading paving material into the hopper 13 of the paving machine.

If the paving machine 10 does not include a delivery path temperature sensor 42, a remote (relative to the paving machined 10) sensor in the form of the truck temperature sensor 62 on the haul truck 50 may be used to determine the temperature of the paving material within the dump body 55. In such case, a paving material delivery path may be defined by the dump body 55 of the haul truck 50 together with the paving material delivery path 17 within or of the paving machine 10. With such a configuration, the control of the operation of the heating system 23 of the paving machine 10 may be similar to that depicted in FIG. 1.

As described in more detail below, one difference between the operation of FIGS. 1 and 3 is that the temperature of the paving material along the material delivery path is sensed at the dump body 55 of the haul truck 50 rather than at a location on the paving machine 10. Another difference is that the paver controller 31 may operate in conjunction with the truck controller 57 with the functionality of controlling the heating system 23 distributed between the paver controller and the truck controller in any desired manner. As used herein, the paver controller 31, the truck controller 57 or a combination of the two controllers may be referred to herein and is depicted generally in FIG. 3 as controller 65.

Figure 5:
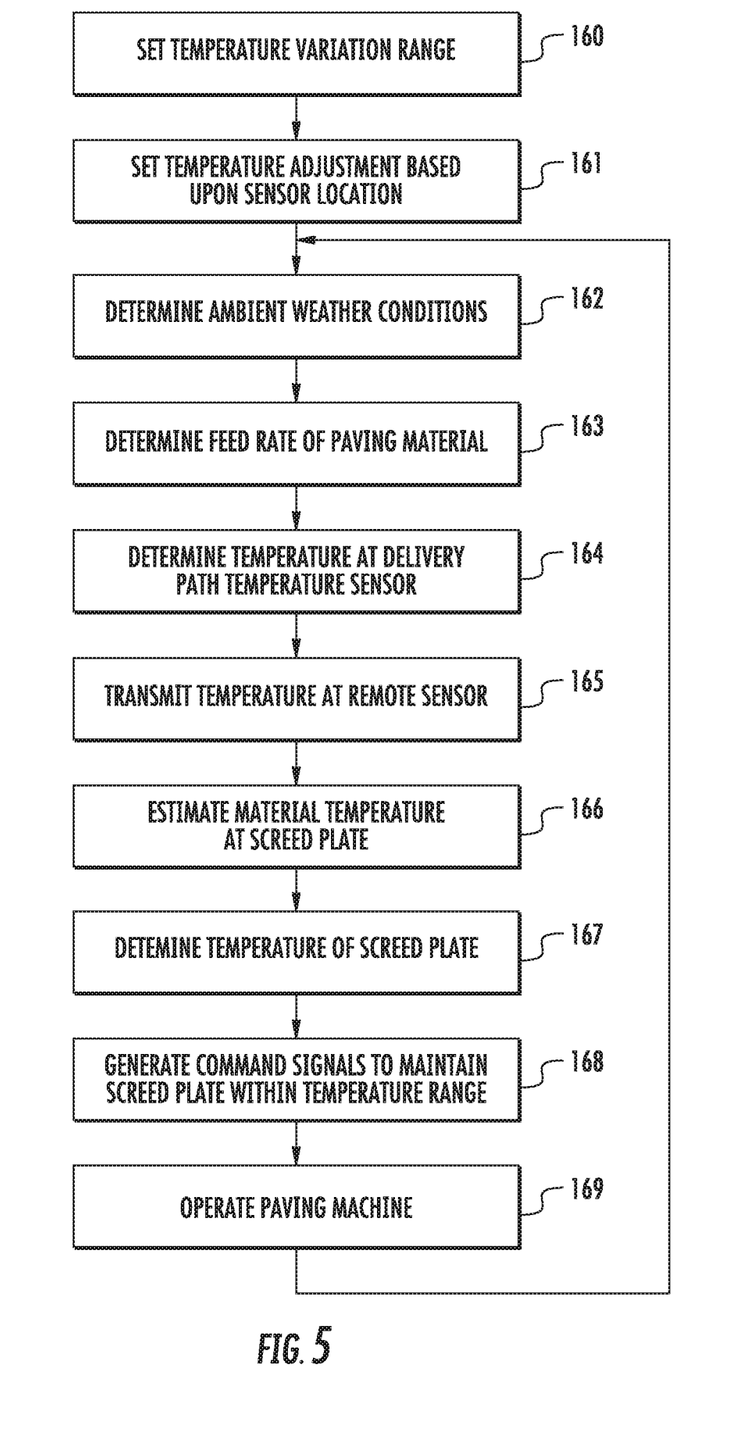
FIG. 5 depicts a flowchart illustrating a screed heating process in conjunction with the paving operation of FIG. 3.

Referring to FIG. 5, a flowchart of an exemplary paving operation utilizing paving machine 10 in conjunction with haul truck 50 is depicted. Descriptions of stages that are identical or similar to stages of FIG. 2 are, in some instances, shortened for purposes of brevity.

At stage 160, a desired temperature variation range that the screed plate temperature can vary may be set or stored within the controller 65. In an alternate embodiment, the variation temperature range may be stored remotely from the controller 65 and the controller may access the desired temperature range.

A temperature adjustment based upon the distance between the screed plate 22 and the delivery path temperature sensor (e.g., truck temperature sensor 62) may be set or stored within the paver controller 31 at stage 151. In an alternate embodiment, such a distance temperature adjustment may be stored remotely from the controller 65 and the controller may access the distance temperature adjustment.

At stage 162, the weather conditions (e.g., ambient temperature and/or wind conditions) at the paving machine 10 and haul truck 50 may be determined. The weather conditions may be determined by an on-board sensor such as ambient weather sensor 43 or may be accessed by the controller 65 from known weather sources. The feed rate of paving material from the haul truck 50 to the hopper 13 and to the screed assembly 14 may be determined at stage 163 based upon signals or data from the feed rate sensor 40 on the paving machine 10 and the position of the dump body 55 based upon signals or data from the pivot position sensor 63.

At stage 164, the controller 65 may determine the actual paving material temperature at truck temperature sensor 62 of the haul truck 50 based upon truck temperature signals from the sensor.

In one example, the actual temperature of the paving material within the dump body 55 may be determined by the truck controller 57 based upon signals or data from the truck temperature sensor 62 associated with the dump body. The actual temperature of the paving material within the dump body 55 may be transmitted at stage 165 by the truck controller 57 via the transmitter 66 of the wireless communications systems 65 of the haul truck 50 to the receiver 67 of the wireless communications system 65 of the paving machine 10.

In another example, signals or data from the truck temperature sensor 62 may be transmitted by the truck controller 57 via the transmitter 66 of the wireless communications systems 65 of the haul truck 50 to the receiver 67 of the wireless communications system 65 of the paving machine 10 and the paver controller 31 may determine the actual temperature of the paving material within the dump body 55 based upon the transmitted signals or data from the truck temperature sensor 62.

The controller 65 (e.g., paver controller 31) may determine at stage 166 an estimated temperature of the paving material adjacent the screed plate 22. In doing so, the controller 65 may utilize the actual paving material temperature at the truck temperature sensor 62 (which functions as a remote delivery path temperature sensor) and adjust the actual temperature based upon any of the temperature adjustment characteristics.

At stage 167, the controller 65 may determine the actual screed plate temperature at the screed plate temperature sensor 41 based upon screed plate signals from the sensor. The controller 65 may generate at stage 168 command signals to maintain the temperature of the screed plate 22 within the temperature variation range of the estimated paving material temperature at or adjacent the screed plate. In doing so, the controller 65 may compare the actual temperature of the screed plate 22 to the estimated temperature of the paving material at the screed plate and turn on or cycle the heating system 23 as necessary so that the temperature of the screed plate remains within the desired temperature range of the estimated temperature of the paving material.

At stage 169, the paving machine 10 and haul truck 50 may continue to be operated and paving material 102 applied to the work surface and stages 162-168 repeated.

In another example in which the delivery path temperature sensor is located on a material supply machine, the paving machine 10, the paving machine may be operated in conjunction with a remixing transfer vehicle 70, either with (FIG. 6) or without a haul truck 50. Remixing transfer vehicle 70 permits material that has been segregated by size and/or temperature to be remixed before being fed into the hopper 13 of the paving machine 10. Remixing transfer vehicle 70 includes a material transfer and remix system 71 and a prime mover such as an engine 72 operatively connected to a ground engaging drive mechanism such as wheels 73.

Figure 6:
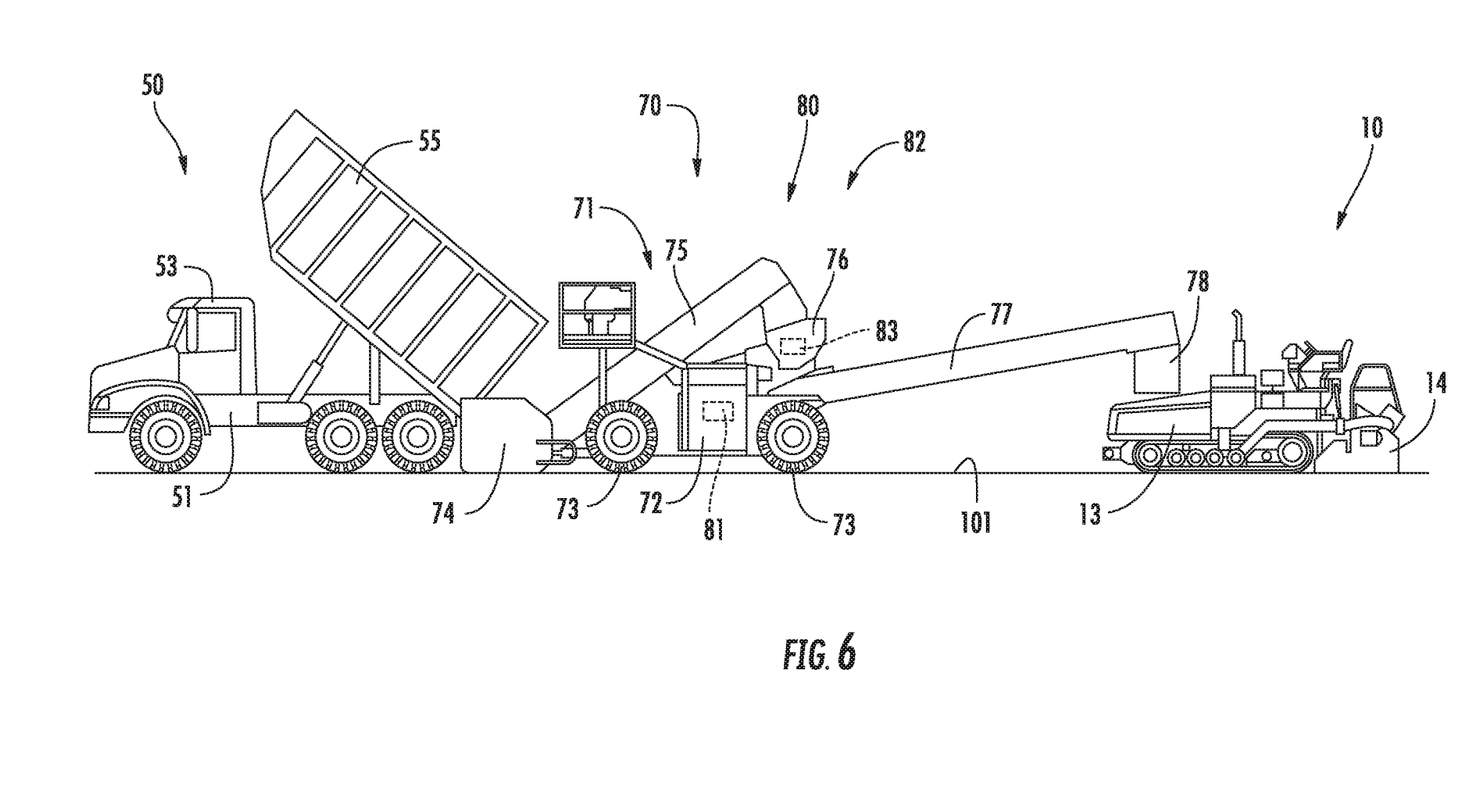
FIG. 6 depicts a schematic illustration similar to FIG. 3 but further including a remixing transfer vehicle between the paving machine and the haul truck.

The material transfer and remix system 71 may include a dump hopper 74 into which paving material may be dumped and a conveyor 75 for conveying or transporting material from the dump hopper to a remix hopper 76 in which the paving material may be remixed and re-heated. The remixing transfer vehicle 70 may further include a swingable or pivotable transfer conveyor 77 for conveying or transporting material from the remix hopper 76 to an outlet 78. By aligning outlet 78 with hopper 13 of paving machine 10, material exiting from the outlet may be conveyed from the dump hopper 74 to the hopper 13 of the paving machine after the remixing operation has been completed.

Remixing transfer vehicle 70 may include a vehicle control system 80 and a vehicle controller 81 generally similar or identical to the paver control system 30 and the paver controller 31 of paving machine 10, respectively. The remixing transfer vehicle 70 may also include a plurality of vehicle sensors, generally indicated at 82, that are generally similar or identical to the paver sensors 35 of the paving machine 10 and/or the truck sensors 58 of the haul truck 50. One example of a vehicle sensor may be a remix temperature sensor 84 that may be provided or disposed at the remix hopper 76, along the pivotable transfer conveyor 77 or at any other desired location. The remix temperature sensor 84 may function as a delivery path temperature sensor that is remote from the paving machine 10.

The remixing transfer vehicle 70 may also include a wireless communications system generally indicated at 65 that is generally similar or identical to the wireless communications systems 65 of the paving machine 10 and the haul truck 50.

Operation of the paving machine 10 with remixing transfer vehicle 70 may be substantially identical to the operation of the paving machine with the haul truck 50 and the description thereof is not repeated herein. In such case, the remix temperature sensor 84 may operate as the remote delivery path temperature sensor.

Figure 7:
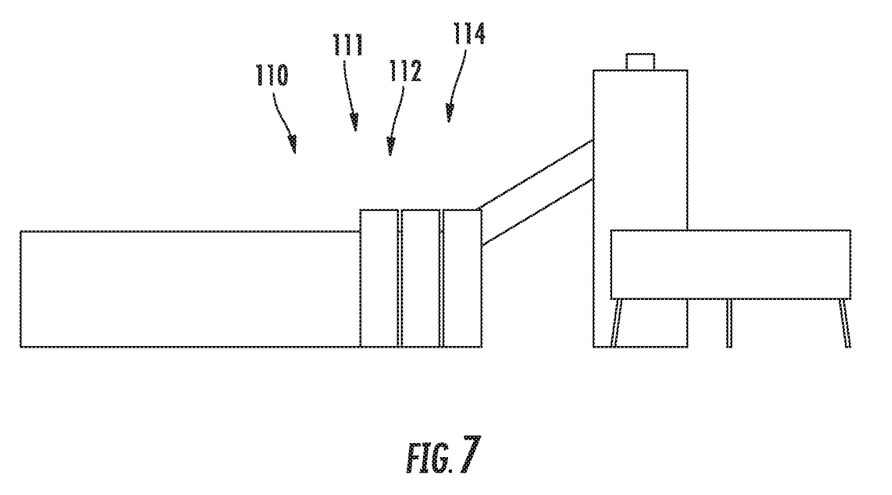
FIG. 7 depicts a schematic illustration of a plant at which paving material is produced.

In still other examples, the delivery path temperature sensor may be disposed at a location farther remote from the paving machine 10. For example, the haul truck 50 may provide temperature data to the paving machine 10 before the haul truck has arrived at the paving site. In another example, the delivery path temperature sensor may be located at a plant 110 configured to produce a paving material such as asphalt as depicted in FIG. 7.

Plant 110 may produce paving material such as asphalt from bitumen, aggregate, and other materials or fillers. The paving material is often produced in batches with each batch stored or held in a separate storage or holding location such as a silo until it is loaded into a haul truck 50 at a loading station. Each holding location may be dedicated to storing or holding paving material for a particular paving site and paving material within a particular holding location is periodically loaded into a haul truck for transport to the paving site. The characteristics of each batch stored within a holding location may be set based upon the desired characteristics for a particular paving job. For example, the amount of oil, the size of the aggregate, and the temperature may be set based upon the desired characteristics of the paving material and the requirements of each paving job.

Each batch may be periodically or continuously mixed at the holding location and maintained at a desired temperature. The temperature at which the paving material is maintained may be set based upon a desired temperature at which the paving material will be loaded into a haul truck 50. Such loading temperature may be based upon the desired temperature at which the load will be delivered to the paving machine 10, the ambient temperature of the air, the expected time required for the haul truck 50 to drive from the plant 110 to the paving machine 10 as well as any expected or anticipated waiting time for the truck at the paving site.

Plant 110 may include a plant control system 111 and a plant controller 112 generally similar or identical to the paver control system 30 and the paver controller 31 of the paving machine 10, respectively. Plant 110 may also include a plurality of plant sensors indicated generally at 113 such as batch temperature sensor indicated generally at 114 operative to monitor the temperature of the batch of paving material within each holding location. The batch temperature sensor 114 may function as a delivery path temperature sensor that is remote from the paving machine 10.

Operation of the paving machine 10 with the batch temperature sensor 114 functioning as the remote delivery path temperature sensor may be substantially identical to the operation of the paving machine with the haul truck 50 and the description thereof is not repeated herein. It will be appreciated that the estimation of the paving material temperature may be more complex due to the distance between the paving machine 10 and the plant 110.

INDUSTRIAL APPLICABILITY

The industrial applicability of the system described herein will be readily appreciated from the forgoing discussion. The foregoing discussion is applicable to systems used with paving machines 10 to heat the screed plate 22 within a desired temperature range of the paving material at the screed plate during a paving operation. The paving operation may be used at a construction site, a roadwork site, a parking lot, or any other area in which the application of paving material to a work surface is desired.

The foregoing system estimates the temperature of the paving material adjacent the screed plate 22 and maintains the screed plate at a temperature within a predetermined range from the estimated temperature. The estimated temperature may be based upon a delivery path temperature sensor disposed along the delivery path of the paving material to the screed assembly 14. In some instances, the delivery path temperature sensor 42 may be disposed on the paving machine 10. In other instances, the delivery path temperature sensor may be disposed on a movable machine that supplies paving material to the paving machine 10 such as a haul truck 50 or a remixing transfer vehicle 70. In still other instances, the delivery path temperature sensor may be located at a plant 110 at which the paving material is mixed.

By maintaining the temperature of the screed plate 22 within a predetermined temperature range of the estimated temperature of the paving material at the screed plate 22, certain benefits may be achieved. The heating system may use less energy to heat the screed plate 22 since the screed plate is only heated when necessary. In addition, by only heating the screed plate 22 when necessary, the heaters 24 are subject to less wear and tear, thus increasing the lifespan of the heaters.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for controlling heating of a screed plate, comprising:
    a paving material delivery path;
    a screed plate operably disposed along the paving material delivery path;
    a first temperature sensor associated with the screed plate, the first temperature sensor being configured to generate first temperature signals indicative of a screed plate temperature;
    a second temperature sensor at a position along the paving material delivery path, the second temperature sensor being configured to generate second temperature signals indicative of an actual paving material temperature of paving material at the position along the paving material delivery path;
    a heater operatively associated with the screed plate and configured to heat the screed plate; and
    a controller configured to:
        access a temperature variation range;
        receive the first temperature signals;
        determine the screed plate temperature based on the first temperature signals;
        receive the second temperature signals;
        determine the actual paving material temperature based on the second temperature signals;
        determine an estimated paving material temperature adjacent the screed plate based on the actual paving material temperature; and
        generate command signals to operate the heater to maintain the screed plate temperature within the temperature variation range relative to the estimated paving material temperature.

2. The system of claim 1, wherein the estimated paving material temperature is further based on at least one temperature adjustment characteristic associated with the position along the paving material delivery path.

3. The system of claim 1, wherein the estimated paving material temperature is further based on a feed rate of the paving material along the paving material delivery path.

4. The system of claim 1, wherein the estimated paving material temperature is further based on weather conditions.

5. The system of claim 1, wherein the second temperature sensor is disposed at a plant for producing paving material, and further comprising a first wireless communications system on a mobile machine that includes the screed plate and a second wireless communications system at the plant, and wherein the second wireless communications system is configured to transmit the second temperature signals indicative of the actual paving material temperature to the first wireless communications system.

6. The system of claim 1, wherein the second temperature sensor is upstream of the screed plate along the paving material delivery path.

7. The system of claim 6, further comprising a hopper and a transport mechanism to transport paving material between the hopper and the screed plate.

8. The system of claim 7, wherein the second temperature sensor is disposed adjacent the hopper and configured to determine the actual paving material temperature of the paving material adjacent the hopper.

9. The system of claim 7, wherein the second temperature sensor is disposed adjacent the transport mechanism and configured to determine the actual paving material temperature of the paving material adjacent the transport mechanism.

10. The system of claim 1, wherein the second temperature sensor is disposed on a material supply machine, the system further comprising a first wireless communications system on a mobile machine that includes the screed plate and a second wireless communications system on the material supply machine, and wherein the second wireless communications system is configured to transmit the second temperature signals indicative of the actual paving material temperature to the first wireless communications system.

11. The system of claim 10, wherein the material supply machine comprises a haul truck.

12. A method of controlling heating of a screed plate, comprising:
    providing a screed plate operably mounted on a mobile machine and disposed along a paving material delivery path;
    receiving first temperature signals from a first temperature sensor associated with the screed plate, the first temperature signals being indicative of a screed plate temperature;
    determining the screed plate temperature based on the first temperature signals;
    receiving second temperature signals from a second temperature sensor disposed along the paving material delivery path, the second temperature signals being indicative of an actual paving material temperature of a paving material;
    determining the actual paving material temperature based on the second temperature signals;
    determining an estimated paving material temperature adjacent the screed plate based on the actual paving material temperature;
    setting a temperature variation range based on the estimated paving material temperature; and
    generating command signals to operate a heater associated with the screed plate and configured to heat the screed plate to maintain the screed plate temperature within the temperature variation range relative to the estimated paving material temperature.

13. The method of claim 12, further including determining the estimated paving material temperature based on at least one temperature adjustment characteristic associated with a location of the second temperature sensor.

14. The method of claim 12, further including determining the estimated paving material temperature based on a feed rate of the paving material, wherein the feed rate is determined based at least in part on feed rate signals from a feed rate sensor disposed adjacent to a transport mechanism of the mobile machine.

15. The method of claim 12, further including determining the estimated paving material temperature based on weather conditions at the mobile machine.

16. The method of claim 12, further comprising transmitting the second temperature signals indicative of the actual paving material temperature via a second wireless communications system on a material supply machine to a first wireless communications system on the mobile machine.

17. A paving machine comprising:
a paving material delivery path;
a screed assembly disposed along the paving material delivery path and configured for applying paving material to a work surface, the screed assembly including a screed plate;
a first temperature sensor associated with the screed plate, the first temperature sensor being configured to generate first temperature signals indicative of a screed plate temperature;
a second temperature sensor disposed along the paving material delivery path at a position upstream of the screed plate, the second temperature sensor being configured to generate second temperature signals indicative of an actual paving material temperature of a paving material at the position of the second temperature sensor;
a heater operatively associated with the screed plate and configured to heat the screed plate; and
a controller configured to:
access a temperature variation range;
receive the first temperature signals;
determine the screed plate temperature based on the first temperature signals;
receive the second temperature signals;
determine the actual paving material temperature based on the second temperature signals;
determine an estimated paving material temperature adjacent the screed plate based on the actual paving material temperature; and
generate command signals to operate the heater to maintain the screed plate temperature within the temperature variation range relative to the estimated paving material temperature.

18. The paving machine of claim 17, wherein the estimated paving material temperature is further based on a feed rate of the paving material, and
wherein the controller is configured to cycle the heater on and off to selectively heat the screed plate.

19. The paving machine of claim 17, wherein the estimated paving material temperature is further based on at least one temperature adjustment characteristic associated with the position of the second temperature sensor.

20. The paving machine of claim 19, wherein the at least one temperature adjustment characteristic associated with the position of the second temperature sensor is a fixed temperature adjustment characteristic, and
wherein the estimated paving material temperature is further based on weather conditions at the paving machine.

* * * * *